Figure 1:
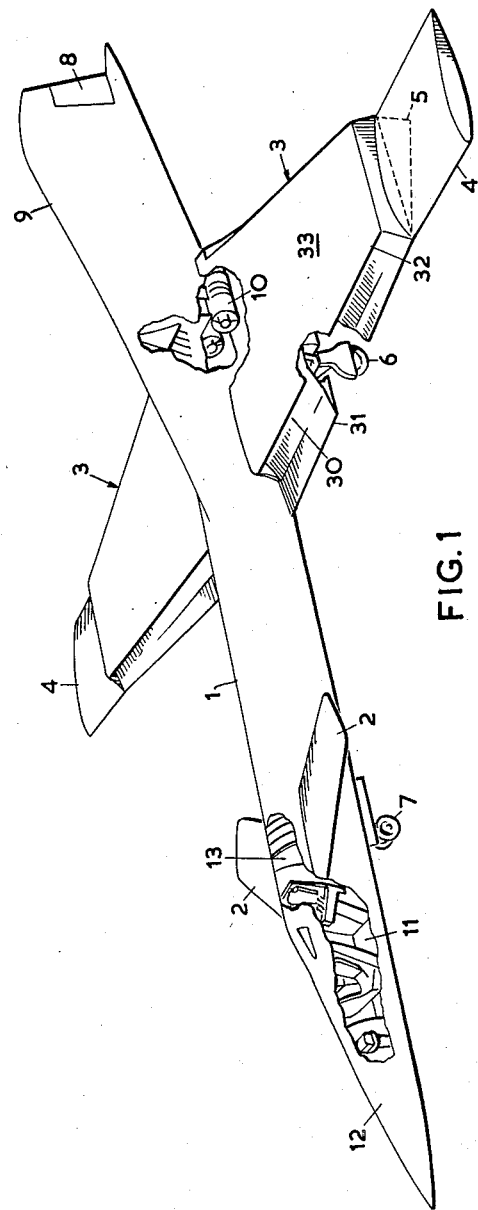

May 2, 1961 R. F. CREASEY ET AL 2,982,496
AIRCRAFT
Filed Dec. 27, 1956 3 Sheets-Sheet 1

Inventors:
Raymond F. Creasey
Bernard O. Heath
By: Stevens, Davis, Miller + Mosher
Attorneys May 2, 1961  R. F. CREASEY ET AL  2,982,496
AIRCRAFT
Filed Dec. 27, 1956  3 Sheets-Sheet 2
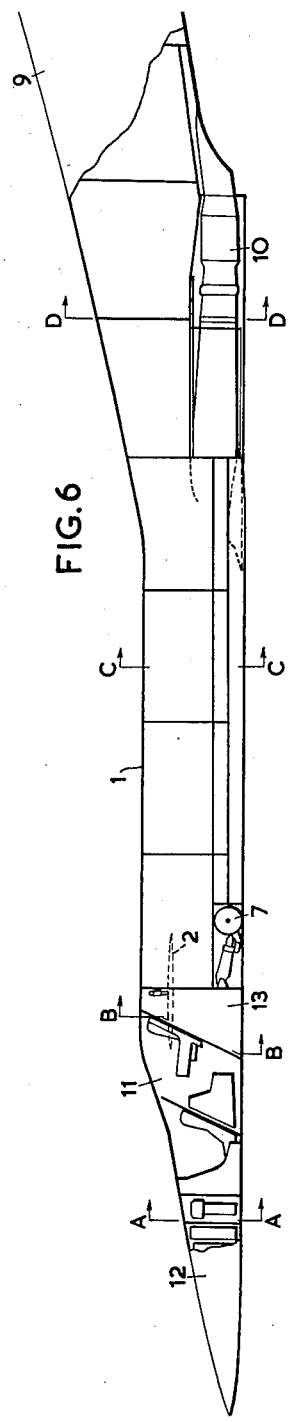
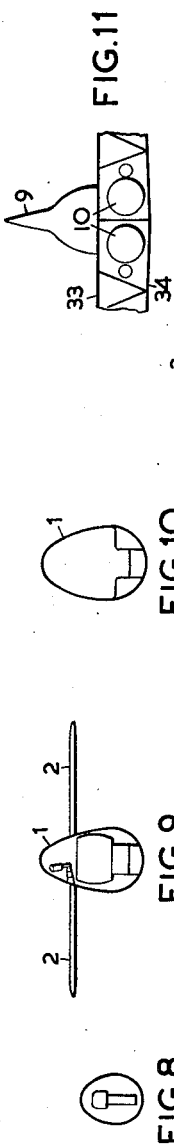
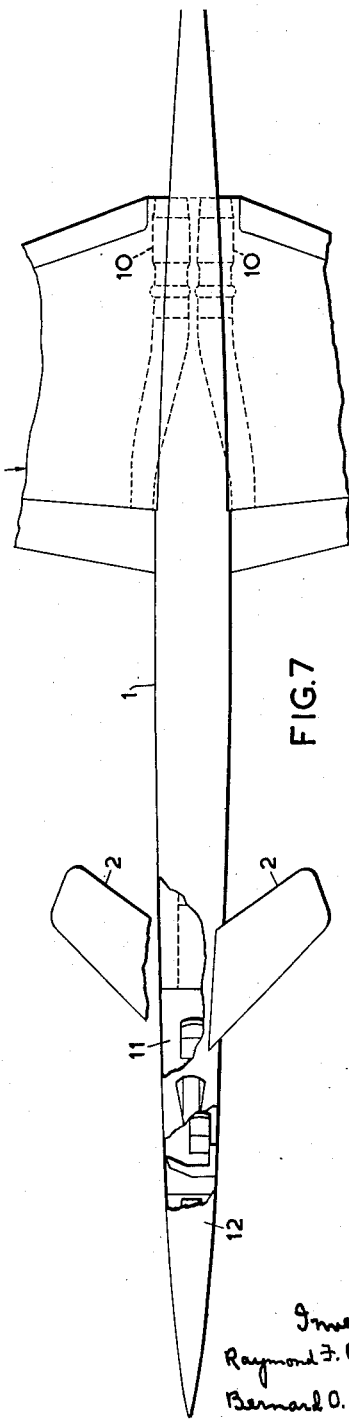

May 2, 1961  R. F. CREASEY ET AL  2,982,496
AIRCRAFT

Filed Dec. 27, 1956  3 Sheets-Sheet 3

Inventors:
Raymond F. Creasey
Bernard O. Heath
Stevens, Davis, Miller & Mosher, Attorneys

United States Patent Office 2,982,496
Patented May 2, 1961

---

2,982,496

AIRCRAFT

Raymond Frederick Creasey, Lytham St. Annes, and Bernard Oliver Heath, Lea, near Preston, England, assignors to The English Electric Company Limited, London, England, a British company Filed Dec. 27, 1956, Ser. No. 631,000

Claims priority, application Great Britain Jan. 11, 1956

3 Claims. (Cl. 244—15)

The invention relates to an aircraft designed for long distance cruising at Mach numers of $M=3$ at altitudes of 70,000 feet or more.

According to the invention a wing structure structurally combined with the ducts of by-pass ram jet engines, and possibly turbo jet engines as well, is arranged at the rear portion of a fuselage while an all-moving fore-plane, corresponding to the lifting surfaces of aircraft according to our United States patent application Serial No. 351,791 is arranged on the front portion of the fuselage, its roots being located adjacent the crew's cockpit.

The nose portion of the fuselage contains radar and photographic equipment of a kind requiring no pressurization or a pressurization not exceeding that of the crew's cockpit, while radar or radio equipment requiring higher pressurization is housed immediately behind the crew's cockpit.

A dorsal fin in the shape of a very acute triangle having its apex on the fuselage approximately behind the leading edge of the upper wing panel, and its base at the slim tail end of the fuselage substantially behind the root of the trailing edge of the wing, is smoothly faired into the fuselage, and has at the lower part of its trailing edge a comparatively small rudder. The areoelastic advantage of this fin-and-rudder arrangement is that conventional flutter couplings are eliminated.

The nose wheel is arranged just behind the crew's cockpit and retracts backwards into the fuselage, while the main undercarriage may be hinged on the wings and retract inwardly into the same.

The main part of the fuselage behind the crew's cockpit serves as the main fuel tank and contains radar aerials in its interior adjacent its bottom skin. The interior of the wings, i.e. the space between the inner wing panel forming a wall of the ram air intake and intake diffusor and the adjacent outer wing panel may be also designed as a fuel tank, the fuel being drawn from the tank in the fuselage towards the wing tips in the upper portion of the wing fuel tanks and returning towards the wing root in the lower portion thereof, thereby providing a cooling effect on the inner, and adjacent outer wing panels.

Jettisonable fuel tanks of a profile suitable for subsonic flight velocities may be attached at the wing tips. The fuel content of these wing tip tanks is used up first during the climb of the aircraft to the design cruising altitude, and these wing tip fuel tanks are then jettisoned.

In addition to the by-pass ram jets built integrally into the wing structure two turbo jet engines may be embedded near the trailing edge at the wing roots and the same supplied with air from intakes at the leading edge of the wings near the roots, and operated on the same fuel as the ram jet engines.

Alternatively or additionally turbo jets may be disposed within the rear portion of the wing, alternately with the ram jet burners. Such an arrangement tends to equalize total airflow requirements throughout the Mach number range, and to reduce intake losses in off design conditions. These turbo jet engines provide propulsive power at the take off and the landing approach or during refuelling when at the lower speeds then prevailing the ram jets are less efficient, and help the aircraft to pass a critical Mach number range at about $M=1.2$ during the climb.

These turbo-jet engines supply also power for the auxiliary equipment of the aircraft, and during the high speed-high altitude cruise of the aircraft sufficient power for this purpose is available from the said turbo-jet engines even if the fuel supply to the same has been shut off and they are simply windmilling.

Figure 4:
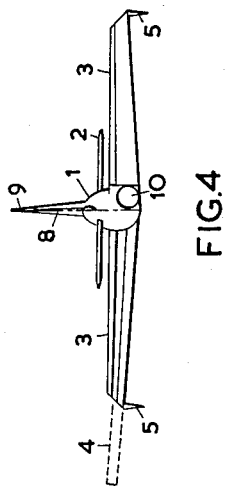
Figure 5:
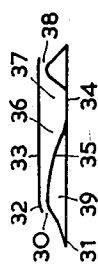
Figure 2:
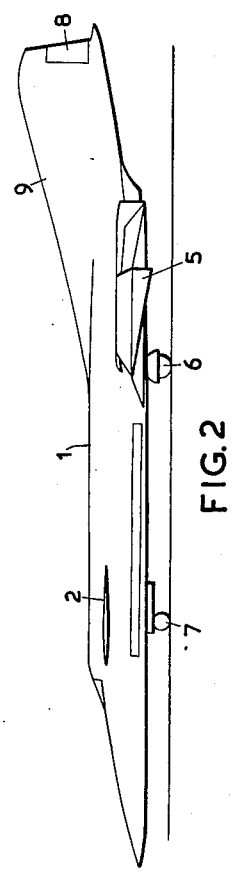
Figure 3:
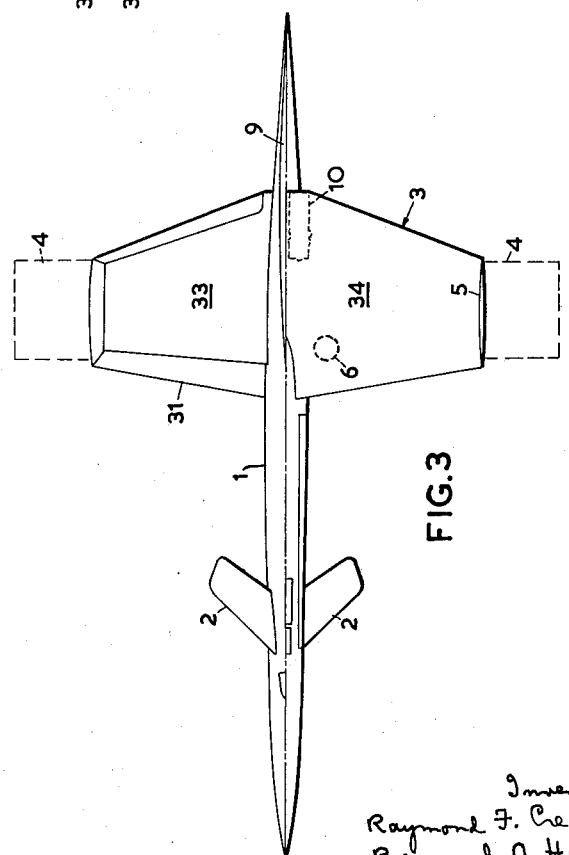

In order that the invention may be clearly understood and readily carried into effect an embodiment thereof will now be described by way of example with reference to the accompanying drawings, in which:

Fig. 1 is a diagrammatic perspective view of the general arrangement of an embodiment of the aircraft partly broken away, Fig. 2 shows a side elevation, Fig. 3 a combined plan view from above and below, Fig. 4 a combined front- and rear-elevation, Fig. 5 a typical wing section, Fig. 6 is a side elevation in section, Fig. 7 a plan view of the aircraft fuselage, partly in section, with the fore-plane and main wing indicated diagrammatically, and Figs. 8 to 11 are cross sections of the fuselage along the lines A—A, B—B, C—C, and D—D of the side elevation respectively.

It will be seen that the all-moving fore-plane 2 mounted on the front portion of the fuselage 1 is of a very pronounced sweep back, say 45° of the leading edge and 30° of the trailing edge, while the main wing 3 is straight with a 1:2 taper and a 2.4 aspect ratio (not including the jettisonable wing tip tanks 4) and 3.75 (with wing tip tanks 4) respectively.

The ram air intakes 30 along the leading edges of the main wings are formed by two-dimensional wedges merging into isentropic curves at the leading edge 31 of the lower wing panels which protrude strongly with respect to the leading edges or lips 32 of the upper wing panels. These isentropic curves cause an efficient continuous compression in the intakes and permit the said lips 32 to function efficiently by virtue of the pressure changes focussed thereon, thus avoiding spillage of air.

Small half-delta fins 5 are mounted at the underside of the wing tips with the apex of the half delta at the leading edge 31 and its base under the trailing edge of lower wing panel 34. These fins 5 serve for reducing tip losses at supersonic speeds.

The main wing 3 has a structural depth of up to 15% at the root and of up to 12.5% at the tip owing to the ducts of the by-pass ram jets and possibly also turbo-jet engines integrally built in between the upper and lower wing panels 33, 34 respectively while the aerodynamic fineness of this wing is 3% to 4½%. While the wing panels 33, 34 are flat (with a slight camber of the top wing panel 33 adjacent the leading edge 32 and trailing edge thereof), with no dihedral of the top wing panel 33, the jettisonable wing tips have a profile adapted to subsonic flight velocities, for example a symmetrical NACA 0010—0.70–40/1.051 areofoil section, and are straight with no taper.

The space included between the upper wing panel 33 and an inner wing panel 35 forms in succession the ram air intake 30 and ram air diffusor 36 followed by by-pass ram jet combustion chamber 37, and an adjustable nozzle 38. The space 39 enclosed between the said inner wing panel 35 and lower wing panel 34 may serve as an additional integral fuel tank, except for a well into which the main undercarriage 6 may be retracted inwardly into each wing 3. This integral wing fuel tank 39 is divided by a horizontal partition into an upper compartment through which the fuel flows outwardly from the main fuel tank in the fuselage, and a lower compartment through which it then flows inwardly towards a fuel pumping and metering system in each wing, supplying a distributor pipe leading spanwise to the various ram jet burners in each wing, and also to the turbo-jet engines embedded in the wing roots adjacent the trailing edge thereof and/or in the wing. A twin nose wheel undercarriage 7 retracts into the fuselage 1 behind the cockpit 11 of the crew.

The all-moving foreplane 2 which is attached to the fuselage 1 adjacent the crew's cockpit 11 is operated mechanically or hydraulically directly from the crew's cockpit, giving control of pitch. Control in roll is provided by differential adjustment of the ram jet nozzles, and if desired of spoilers (not shown) built into the main wing surfaces.

The use of a fore-plane 2 for pitch control has the advantage over the more conventional tail plane of providing upward aero-dynamical forces relieving the loading of the main wing 3 of the aircraft whereas a tail plane produces a downward resultant, adding to the loading of the main wing.

In its position behind the crew's cockpit 11 it does it impede the pilot's view at take-off and landing when visual control of the aircraft is essential.

The aeroelastic advantage of a fore-plane 2 having a strong sweepback is that its flexural distortion causes a loss in the lift slope due to the fore-plane, while the flexure of the fuselage is of the opposite tendency. Hence the effects of distortion cancel one another out to a great extent, and are accordingly minimized.

Directional control is effected by a rudder 8 built into the lower ⅔ of the trailing edge of a dorsal fin 9, the rudder being controlled by remote control.

Refrigeration plant to keep the temperature in the crew's cockpit, and if desired in some instrument compartments 12, 13 of the fuselage, at a comfortable level is also provided, deriving its energy preferably from turbo-jet engines 10 mounted at the rear portion of the fuselage 1, with their jet nozzles adjacent the trailing edge of the wing roots, and also in the wing if desired.

A brake parachute (not shown) is fitted in the tail end of the fuselage.

While in the embodiment of the aircraft herein described by way of example the ram air intake 30 and diffusor 36 are arranged between the inner and the upper wing panels 35, 33 with the leading edge 31 of the lower wing panel 34 protruding beyond the leading edge 32 of the upper wing panel 33 (see particularly Fig. 1 and the typical wing section in Fig. 5) the arrangement may be turned upside down, the flow of fuel remaining, however, in the inboard direction in the lower compartment in any case.

What we claim as our invention, and desire to secure by Letters Patent, is:

1. In a canard type of aircraft having a fuselage, a crew-cockpit arranged in the forward portion of said fuselage, an aerodynamic empennage mounted on the said forward portion of said fuselage, a main sustaining wing mounted on the rear portion of said fuselage, and a propulsion plant mounted in the said main sustaining wing; the said empennage comprising an all-moving swept-back fore-plane having a starboard and a port half-plane each attached pivotally about a transverse axis to the said fuselage and having a root adjacent the said cockpit, and the said main sustaining wing being a straight wing integrated with said propulsion plant as a unit having an upper lift-producing panel and a lower lift-producing panel structurally connected to one another with span-wise gaps between both the leading and trailing edges of said lift-producing panels, said unit containing chordwise ducts for ram air and propulsive combustion gases structurally connected rigidly as load carrying members with said lift-producing panels, and jet propulsion engines forming said propulsion plant built into the said ducts, one of the said lift-producing panels protruding forward beyond the said other lift-producing panel.

2. A canard type of aircraft having a fuselage, a crew-cockpit arranged in the forward portion of said fuselage, an aerodynamic empennage mounted on the said forward portion of said fuselage, a main sustaining wing mounted on the rear portion of said fuselage, and a propulsion plant mounted in the said main sustaining wing; the said empennage comprising a swept-back all-moving fore-plane having a starboard and a port half-plane each attached pivotally about a transverse axis to the said fuselage, and having a root adjacent the said cockpit, and the said main sustaining wing being a straight wing having wing tips and being integrated with said propulsion plant as a unit having an upper lift-producing panel and a lower lift-producing panel structurally connected to one another with spanwise gaps between both the leading and trailing edges of said lift-producing panels, and half-delta fins attached to the underside of the tips of the said lower panel, the apex of said half-delta fins being at the leading edge and the base thereof under the trailing edge of said lower lift-producing wing panel, said unit containing chordwise ducts for ram air and propulsive combustion gases structurally connected rigidly as load carrying members with said lift-producing panels, and jet propulsion engines forming said propulsion plant built into the said ducts, one of the said lift-producing panels protruding forward beyond the said other lift producing panel.

3. A canard type of aircraft having a fuselage, a crew-cockpit arranged in the forward portion of said fuselage, an aerodynamic pitch- and roll-control means mounted on the said forward portion of the fuselage, a main sustaining wing having roots attached to the said rear portion of the fuselage, a dorsal fin and rudder mounted on the said rear portion of the fuselage, and a propulsion plant mounted in the said main sustaining wing; the said aerodynamic pitch- and roll-control means being a swept-back all-moving fore-plane having a starboard and a port half-plane each attached pivotally about a transverse axis to the said fuselage and having a root adjacent the said cockpit, and the said main sustaining wing being a straight wing integrated with said propulsion plant as a unit having an upper lift-producing panel and a lower lift-producing panel structurally connected to one another with spanwise gaps between both the leading and trailing edges of said lift-producing panels, said unit containing chordwise ducts for ram air and propulsive combustion gases structurally connected rigidly as load carrying members with said lift-producing panels and jet propulsion engines forming said propulsion plant built into the said ducts, one of the said lift-producing panels protruding forward beyond the said other lift producing panel, the said dorsal fin being in the shape of a very acute triangle having its apex on the said fuselage adjacent the said roots of the main sustaining wing near the leading edge of said upper lift-producing panel and its base aft of the trailing edge of said upper panel, and the said rudder being of an area small compared to that of said dorsal fin and being hinged in the lower rear portion of said dorsal fin, the trailing edge of said rudder being in alignment with the trailing edge of said fin.

References Cited in the file of this patent

UNITED STATES PATENTS

| | | |
|---|---|---|
| 1,868,832 | Henter et al. | July 26, 1932 |
| 2,003,206 | Lewis | May 28, 1935 |
| 2,271,226 | Johnson | Jan. 27, 1942 |
| 2,584,961 | Beck et al. | Feb. 5, 1952 |
| 2,681,776 | Howard | June 22, 1954 |
| 2,684,817 | Roy | July 27, 1954 |
| 2,693,325 | Lippisch | Nov. 2, 1954 |
| 2,700,515 | Reder | Jan. 25, 1955 |
| 2,723,092 | Paselk et al. | Nov. 8, 1955 |

FOREIGN PATENTS

| | | |
|---|---|---|
| 246,882 | Switzerland | Oct. 16, 1947 |
| 971,992 | France | Aug. 23, 1950 |
| 1,001,944 | France | Oct. 31, 1951 |